United States Patent [19]
Katta et al.

[11] Patent Number: 5,377,266
[45] Date of Patent: Dec. 27, 1994

[54] SCRAMBLE APPARATUS AND DESCRAMBLE APPARATUS

[75] Inventors: Noboru Katta, Itami; Hiroki Murakami, Osaka; Susumu Ibaraki; Seiji Nakamura, both of Toyonaka; Toshihide Akiyama, Takatsuki; Hiroshi Takeno, Kyoto, all of Japan

[73] Assignee: Matsushita Electric Industrial Co., Ltd., Osaka, Japan

[21] Appl. No.: 89,522

[22] Filed: Jul. 21, 1993

[30] Foreign Application Priority Data

| Jul. 21, 1992 | [JP] | Japan | 4-193742 |
| Jul. 27, 1992 | [JP] | Japan | 4-199392 |
| Sep. 29, 1992 | [JP] | Japan | 4-259540 |
| Apr. 13, 1993 | [JP] | Japan | 5-085929 |
| Apr. 13, 1993 | [JP] | Japan | 5-085930 |

[51] Int. Cl.$^5$ ............................................. H04L 9/00
[52] U.S. Cl. ..................................... 380/20; 380/49
[58] Field of Search ...................... 380/14, 18, 20, 49

[56] References Cited

U.S. PATENT DOCUMENTS

| 4,078,152 | 3/1978 | Tuckerman, III | 380/49 |
| 5,058,158 | 10/1991 | Mattias et al. | 380/20 |
| 5,268,961 | 12/1993 | Ng | 380/14 |

FOREIGN PATENT DOCUMENTS

| 0094254A3 | 5/1983 | European Pat. Off. |
| 0514663A2 | 4/1992 | European Pat. Off. |
| 57-207960 | 12/1982 | Japan |
| 2096982 | 4/1990 | Japan |
| 4082435 | 3/1992 | Japan |
| 4192779 | 7/1992 | Japan |
| 4306096 | 10/1992 | Japan |

OTHER PUBLICATIONS

"A Scrambling System –M– for Communication Satellite Television", Nezu et al., ITEJ Technical Report, vol. 15, No. 14, Feb. 1991, pp. 1–6.

Primary Examiner—Salvatore Cangialosi
Attorney, Agent, or Firm—Wenderoth, Lind & Ponack

[57] ABSTRACT

A scramble apparatus is for scrambling data including a variable length code and a descramble apparatus for descrambling a scrambled signal, and a scramble transmission apparatus comprising the scramble apparatus and the descramble apparatus. A specific code of data is converted into a readable code having a length equal to that of an original code.

14 Claims, 15 Drawing Sheets macro block construction of 4:2:0 signal macro block construction of 4:2:2 signal macro block construction of 4:4:4 signal

Fig.4

| motion vector | code words |
|---|---|
| −16 | 0000 0011 001 |
| −15 | 0000 0011 011 |
| −14 | 0000 0011 101 |
| −13 | 0000 0011 111 |
| −12 | 0000 0100 001 |
| −11 | 0000 0100 011 |
| −10 | 0000 0100 11 |
| −9 | 0000 0101 01 |
| −8 | 0000 0101 11 |
| −7 | 0000 0111 |
| −6 | 0000 1001 |
| −5 | 0000 1011 |
| −4 | 0000 111 |
| −3 | 0001 1 |
| −2 | 0011 |
| −1 | 011 |
| 0 | 1 |
| 1 | 010 |
| 2 | 0010 |
| 3 | 0001 0 |
| 4 | 0000 110 |
| 5 | 0000 1010 |
| 6 | 0000 1000 |
| 7 | 0000 0110 |
| 8 | 0000 0101 10 |
| 9 | 0000 0101 00 |
| 10 | 0000 0100 10 |
| 11 | 0000 0100 010 |
| 12 | 0000 0100 000 |
| 13 | 0000 0011 110 |
| 14 | 0000 0011 100 |
| 15 | 0000 0011 010 |
| 16 | 0000 0011 000 |

Fig.5

| coded_block_pattern VLC code | cbp | coded_block_pattern VLC code | cbp |
|---|---|---|---|
| 1 1 1 | 1 1 1 1 0 0 | 0 0 0 1   1 1 0 0 | 1 0 0 0 1 1 |
| 1 1 0 1 | 0 0 0 1 0 0 | 0 0 0 1   1 0 1 1 | 0 0 1 1 0 1 |
| 1 1 0 0 | 0 0 1 0 0 0 | 0 0 0 1   1 0 1 0 | 1 1 0 0 0 1 |
| 1 0 1 1 | 0 1 0 0 0 0 | 0 0 0 1   1 0 0 1 | 0 1 0 1 0 1 |
| 1 0 1 0 | 1 0 0 0 0 0 | 0 0 0 1   1 0 0 0 | 1 0 1 0 0 1 |
| 1 0 0 1   1 | 0 0 1 1 0 0 | 0 0 0 1   0 1 1 1 | 0 0 1 1 1 0 |
| 1 0 0 1   0 | 1 1 0 0 0 0 | 0 0 0 1   0 1 1 0 | 1 1 0 0 1 0 |
| 1 0 0 0   1 | 0 1 0 1 0 0 | 0 0 0 1   0 1 0 1 | 0 1 0 1 1 0 |
| 1 0 0 0   0 | 1 0 1 0 0 0 | 0 0 0 1   0 1 0 0 | 1 0 1 0 1 0 |
| 0 1 1 1   1 | 0 1 1 1 0 0 | 0 0 0 1   0 0 1 1 | 0 0 1 1 1 1 |
| 0 1 1 1   0 | 1 0 1 1 0 0 | 0 0 0 1   0 0 1 0 | 1 1 0 0 1 1 |
| 0 1 1 0   1 | 1 1 0 1 0 0 | 0 0 0 1   0 0 0 1 | 0 1 0 1 1 1 |
| 0 1 1 0   0 | 1 1 1 0 0 0 | 0 0 0 1   0 0 0 0 | 1 0 1 0 1 1 |
| 0 1 0 1   1 | 0 0 0 0 0 1 | 0 0 0 0   1 1 1 1 | 0 1 1 0 0 1 |
| 0 1 0 1   0 | 1 1 1 1 0 1 | 0 0 0 0   1 1 1 0 | 1 0 0 1 0 1 |
| 0 1 0 0   1 | 0 0 0 0 1 0 | 0 0 0 0   1 1 0 1 | 0 1 1 0 1 0 |
| 0 1 0 0   0 | 1 1 1 1 1 0 | 0 0 0 0   1 1 0 0 | 1 0 0 1 1 0 |
| 0 0 1 1   1 1 | 0 1 0 1 0 0 | 0 0 0 0   1 0 1 1 | 0 1 1 1 0 1 |
| 0 0 1 1   1 0 | 1 0 0 1 0 0 | 0 0 0 0   1 0 1 0 | 1 0 1 1 0 1 |
| 0 0 1 1   0 1 | 0 0 0 0 1 1 | 0 0 0 0   1 0 0 1 | 1 1 0 1 0 1 |
| 0 0 1 1   0 0 | 1 1 1 1 1 1 | 0 0 0 0   1 0 0 0 | 1 1 1 0 0 1 |
| 0 0 1 0   1 1 1 | 0 0 0 1 0 1 | 0 0 0 0   0 1 1 1 | 0 1 1 1 1 0 |
| 0 0 1 0   1 1 0 | 0 0 1 0 0 1 | 0 0 0 0   0 1 1 0 | 1 0 1 1 1 0 |
| 0 0 1 0   1 0 1 | 0 1 0 0 0 1 | 0 0 0 0   0 1 0 1 | 1 1 0 1 1 0 |
| 0 0 0 1   1 0 0 | 1 0 0 0 0 1 | 0 0 0 0   0 1 0 0 | 1 1 1 0 1 0 |
| 0 0 1 0   0 1 1 | 0 0 0 1 1 0 | 0 0 0 0   0 0 1 1 1 | 0 1 1 1 1 1 |
| 0 0 1 0   0 1 0 | 0 0 1 0 1 0 | 0 0 0 0   0 0 1 1 0 | 1 0 1 1 1 1 |
| 0 0 1 0   0 0 1 | 0 1 0 0 1 0 | 0 0 0 0   0 0 1 0 1 | 1 1 0 1 1 1 |
| 0 0 1 0   0 0 0 | 1 0 0 0 1 0 | 0 0 0 0   1 0 1 0 0 | 1 1 1 0 1 1 |
| 0 0 0 1   1 1 1 1 | 0 0 0 1 1 1 | 0 0 0 0   0 0 0 1 1 | 0 1 1 0 1 1 |
| 0 0 0 1   1 1 1 0 | 0 0 1 0 1 1 | 0 0 0 0   0 0 0 1 0 | 1 0 0 1 1 1 |
| 0 0 0 1   1 1 0 1 | 0 1 0 0 1 1 | | |

Fig.6

| (NOTE 1) code words | run | level |
|---|---|---|
| 1 0 | end_of_block | |
| 1 s (NOTE 2) | 0 | 1 |
| 1 1 s (NOTE 3) | 0 | 1 |
| 0 1 1 s | 1 | 1 |
| 0 1 0 0 s | 0 | 2 |
| 0 1 0 1 s | 2 | 1 |
| 0 0 1 0 1 s | 0 | 3 |
| 0 0 1 1 1 s | 3 | 1 |
| 0 0 1 1 0 s | 4 | 1 |
| 0 0 0 1 1 0 s | 1 | 2 |
| 0 0 0 1 1 1 s | 5 | 1 |
| 0 0 0 1 0 1 s | 6 | 1 |
| 0 0 0 1 0 0 s | 7 | 1 |
| 0 0 0 0 1 1 0 s | 0 | 4 |
| 0 0 0 0 1 0 0 s | 2 | 2 |
| 0 0 0 0 1 1 1 s | 8 | 1 |
| 0 0 0 0 1 0 1 s | 9 | 1 |
| 0 0 0 0 0 1 | escape | |
| 0 0 1 0 0 1 1 0 s | 0 | 5 |
| 0 0 1 0 0 0 0 1 s | 0 | 6 |
| 0 0 1 0 0 1 0 1 s | 1 | 3 |
| 0 0 1 0 0 1 0 0 s | 3 | 2 |
| 0 0 1 0 0 1 1 1 s | 1 0 | 1 |
| 0 0 1 0 0 0 1 1 s | 1 1 | 1 |
| 0 0 1 0 0 0 1 0 s | 1 2 | 1 |
| 0 0 1 0 0 0 0 0 s | 1 3 | 1 |
| 0 0 0 0 0 0 1 0 1 0 s | 0 | 7 |
| 0 0 0 0 0 0 1 1 0 0 s | 1 | 4 |
| 0 0 0 0 0 0 1 0 1 1 s | 2 | 3 |
| 0 0 0 0 0 0 1 1 1 1 s | 4 | 2 |
| 0 0 0 0 0 0 1 0 0 1 s | 5 | 2 |
| 0 0 0 0 0 0 1 1 1 0 s | 1 4 | 1 |
| 0 0 0 0 0 0 1 1 0 1 s | 1 5 | 1 |
| 0 0 0 0 0 0 1 0 0 0 s | 1 6 | 1 |

NOTE 1–final bit 's' is a code bit, i.e., 0 at positive, 1 at negative
NOTE 2–use in the case of initial efficiency
NOTE 3–use in the case of exception of initial efficiency

Fig. 7

| motion vector | | code words | | |
|---|---|---|---|---|
| −16 | 16 | 0000 | 0011 | 001 |
| −15 | 17 | 0000 | 0011 | 011 |
| −14 | 18 | 0000 | 0011 | 101 |
| −13 | 19 | 0000 | 0011 | 111 |
| −12 | 20 | 0000 | 0100 | 001 |
| −11 | 21 | 0000 | 0100 | 011 |
| −10 | 22 | 0000 | 0100 | 11 |
| −9 | 23 | 0000 | 0101 | 01 |
| −8 | 24 | 0000 | 0101 | 11 |
| −7 | 25 | 0000 | 0111 | |
| −6 | 26 | 0000 | 1001 | |
| −5 | 27 | 0000 | 1011 | |
| −4 | 28 | 0000 | 111 | |
| −3 | 29 | 0001 | 1 | |
| −2 | | 0011 | | |
| −1 | | 011 | | |
| 0 | | 1 | | |
| 1 | | 010 | | |
| 2 | | 0010 | | |
| 3 | −29 | 0001 | 0 | |
| 4 | −28 | 0000 | 110 | |
| 5 | −27 | 0000 | 1010 | |
| 6 | −26 | 0000 | 1000 | |
| 7 | −25 | 0000 | 0110 | |
| 8 | −24 | 0000 | 0101 | 10 |
| 9 | −23 | 0000 | 0101 | 00 |
| 10 | −22 | 0000 | 0100 | 10 |
| 11 | −21 | 0000 | 0100 | 010 |
| 12 | −20 | 0000 | 0100 | 000 |
| 13 | −19 | 0000 | 0011 | 110 |
| 14 | −18 | 0000 | 0011 | 100 |
| 15 | −17 | 0000 | 0011 | 010 |

SCRAMBLE APPARATUS AND DESCRAMBLE APPARATUS

BACKGROUND OF THE INVENTION

1. Field of the Invention

The present invention relates to a scramble apparatus and a descramble apparatus which can be used by persons of limited skill in scrambling and decoding operations which are required to transmit or preserve digital-coded signals, and more particularly, to a scramble apparatus which effectively controls the degree of scramble according to purpose and a descramble apparatus for reproducing a scrambled signal and to a scramble transmission apparatus comprising the scramble apparatus and the descramble apparatus.

2. Description of the Prior Arts

Conventional effective control scramble is used in TV broadcasting. Regarding a scramble apparatus for handling a digital signal, sound signal scramble is described in *Television Institution Technical Report* Vol. 15, No. 14, pp.1–6.

The conventional scramble apparatus comprises an exclusive OR calculation device for applying random numbers to an inputted signal; a random number generator for generating a series of random numbers by using a scramble key; and a control circuit, disposed between the random number generator and the exclusive OR calculation device, for controlling the random number to be applied to an inputted signal.

In the construction of the conventional scramble apparatus, the exclusive OR calculation device performs an logical exclusive OR of the inputted signal by using a series of pseudo random numbers generated by the random number generator. In this manner, the inputted signal is bit-inverted. The control circuit controls the bit inversion rate of inputted signals by appropriately switching the application of the random numbers to the inputted signals. In performing decoding, the exclusive OR calculation device performs an logical exclusive OR of a scrambled signal by using the random numbers generated by the random number generator. The pseudo random number generated by the random number generator is determined by the scramble key and decoding can be accomplished by only persons having the scramble key.

In the above-described conventional scramble apparatus and an apparatus for reproducing the scrambled signal, when the inputted signal has been fixed length-coded, the position of each code and the code length thereof are known if a bit of data is inverted at random. Therefore, a code to which random numbers have not been applied is correctly reproduced and the degree in which a person not having the scramble key can reproduce the scrambled signal can be controlled by a random number-applying rate.

The above-described conventional scramble apparatus has the following problem: When an inputted signal includes a variable length code, even a variable length-coded portion is converted into a random bit pattern by scramble processing. This is because the signal is bit-inverted at random. In the variable length-coded code, the length of the code is not constant and all bit patterns which can be expressed by each code length do not exist in a code book. When several bits of the code are inverted, the code becomes an unproducible code because the code is not provided in the code book or is interpreted as a code having a different code length from the original code. As a result, the start position of the following code is erroneously found and subsequent data cannot be reproduced.

Another disadvantage of the conventional scramble apparatus is that in the case of compression-coded data, the data is often coded in several parameters and the degree of influence is different depending on the particular parameter used when the data is extension-processed. Thus, when the data is scrambled at random, control cannot be favorably accomplished.

SUMMARY OF THE INVENTION

It is an object of the present invention to provide a scramble apparatus for effectively controlling an inputted signal including a variable length code, a descramble apparatus for restoring a scramble signal to an original signal, and a scramble transmission apparatus comprising the scramble apparatus and the descramble apparatus.

It is another object of the present invention to provide a scramble apparatus for effectively controlling compression-coded data, a descramble apparatus, and a scramble transmission apparatus comprising the scramble apparatus and the descramble apparatus.

In accomplishing these and other objects of the present invention, a scramble apparatus converts the code of an inputted signal including variable length codes into a readable code having a length equal to that of an original code.

According to the above construction, the quantity of scrambled data is equal to that of original data. When the scrambled data is reproduced without performing descramble, only a converted code is reproduced in an erroneous value and other codes are not affected by the conversion. That is, only a particular code is erroneously reproduced without changing the quantity of the data.

A conversion device selects variable length codes, to be scrambled, included in the data and converts each of the selected variable length codes into a code, provided in a code book, having a length equal to that of an original variable length code and indicating a value different from that of the original variable length code.

According to the above construction, the converted code can be read and there is no influence on other codes. A favorable control can be accomplished without changing the quantity of the data.

A fixed length code is selected from variable length codes and fixed length codes included in the data so as to scramble the selected fixed length codes.

According to the above construction, a bit length is not erroneously read after scramble is performed. That is, only the data is reproduced erroneously.

The conversion device comprises a coder for coding original data indicated by each code word, for converting the code word of each code into a code word, provided in the code book, having a length equal to that of the original code word and indicating a significance different from that of the original code word; and a packing device for arranging and reading coded codes, thus generating a data sequence conforming to a rule.

According to the above construction, simultaneously with a signal coding, scramble processing is executed. Therefore, compared with a construction in which coding is performed and then a bit stream is scrambled, the apparatus of the first embodiment eliminates the provision of detector for detecting a code to be scrambled and can generate a scramble signal efficiently.

According to the scramble apparatus of the present invention, the following advantages are further observed.

(1) The predictive value of a predictive-coded image is made to have an erroneous value. The predicted value corresponds to a different position of the image. Therefore, an object of the image looks as though it moves at random.

(2) When data is reproduced without performing descramble, each block is reproduced at an erroneous position. Therefore, it looks as if data arrangement was changed.

(3) In each block of DCT, the image can be controlled in the frequency region of the image data by scrambling. A reproduced image is blurred in its outline. In addition, an image formed by predictive coding is influenced by a deteriorated predictive value.

(4) The DC component of an image is scrambled and thus luminance and hue of the image can be greatly deteriorated. In addition, a great scramble effect can be obtained in a predictive-coded portion of the image. Furthest, in the fixed length code of the data in conformity to MPEG standard, scrambling can be accomplished without other codes being affected by applying random numbers.

(5) Although the quality of an image itself is not deteriorated greatly, the level of the luminance and hue of the image is deteriorated. In addition, the quantization level is not uniform in the entire image. In the case of data, such as a coded block, which is altered for each portion of the image, quantization level is discontinuous each time it is updated.

There is provided a descramble apparatus comprising an inverse conversion device performing an inverse conversion. Thus, reproduction can be accomplished by descrambling a scrambled signal.

The present invention comprises the scramble apparatus and the descramble apparatus.

According to the above construction, data can be correctly transmitted between an admitted sending person and an admitted receiving person. In the case of unadmitted receiver, data transmission can be appropriately controlled.

A descramble apparatus comprising a descramble decoding device receives a scramble signal obtained by converting a part or all codes of data including variable length codes into different codes each having a length equal to that of an original code and indicating a value different from that of the original code; and performs decoding processing or descramble processing and decoding processing.

According to the above construction, the descramble processing and the decoding processing of each code are performed by reading data once whereas in the conventional apparatus, the descramble processing and the decoding processing of each code are performed separately, i.e., a device for the descramble processing and a device for the decoding processing are required. Thus, the present invention provides a compact circuit.

The descramble decoding device comprises a decoder for decoding each code of inputted data and a code conversion device, wherein the decoder decodes each code of inputted data similarly to a signal not scrambled; and the code conversion device descrambles a scrambled signal and converts the descrambled signal into the same data as that generated by decoding each code.

According to the above construction, each code of the scramble signal is decoded before descramble processing is executed. Thereafter, each code is converted into the value of original data. Thus, the decoding device of the present invention serves as a reading device while in the conventional reproducing apparatus, a detecting device for detecting a scrambled portion and the reproducing device are required to read each code. Hence, the present invention provides a compact circuit.

The descramble decoding device comprises a decoding detecting device for detecting a scramble processing section based on the decoding of each code included in inputted data and a decoded result and an inverse conversion device for performing a conversion inverse to scramble processing, wherein the decoding detecting device detects a scrambled portion of inputted data; and the inverse conversion device converts the detected portion into an original data; and the converted data is inputted to the decoding detecting device, whereby the converted data is decoded to obtain a reproduced signal.

According to the above construction, the decoding detecting device detects a scrambled portion and the descrambled signal is supplied to the decoding detecting device based on a detected result so that each code is decoded. That is, the decoding device of the present invention serves as a reading device and hence, a compact circuit can be manufactured. Further, the conversion processing inverse to the conversion processing is performed before decoding operation is carried out. Therefore, a simple construction can be provided.

A descramble apparatus as defined in claim 31, wherein the descramble decoding device comprises the inverse conversion device for performing a conversion inverse to scramble processing; and the decoding detecting device which decodes a code which has released from scramble or not been scrambled and detects a scrambled portion of signals to be inputted based on a decoded result, wherein the inverse conversion device descrambles the scrambled portion detected by the decoding detecting device.

According to the above construction, since the scrambled portion is detected based on a decoded signal, a compact circuit for detecting the scrambled portion can be provided. It is unnecessary to refer to a code book twice because the scrambled portion can be detected based on the decoded signal.

BRIEF DESCRIPTION OF THE DRAWINGS

These and other objects and features of the present invention will become clear from the following description taken in conjunction with the preferred embodiments thereof with reference to the accompanying drawings, in which:

FIG. 4 is an explanatory view showing a code book of a motion vector used in MPEG standard;

FIG. 5 is an explanatory view showing a code book of a code block pattern used in MPEG standard;

FIG. 6 is an explanatory view showing a code book of a coefficient component of DCT (discrete cosine transform) used in MPEG standard;

FIG. 7 is an explanatory view showing a code book of a motion vector used in H.261;

DETAILED DESCRIPTION OF THE INVENTION

Figure 1:
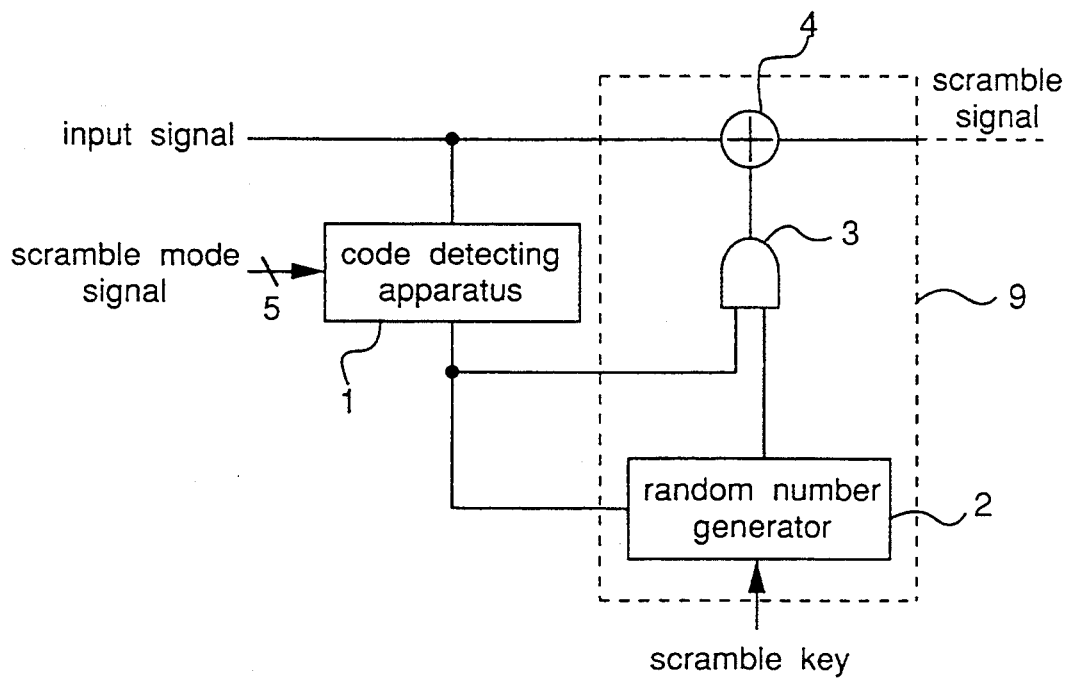
FIG. 1 is a block diagram showing the construction of a scramble apparatus and a descramble apparatus according to a first embodiment of the present invention.
Figure 1:
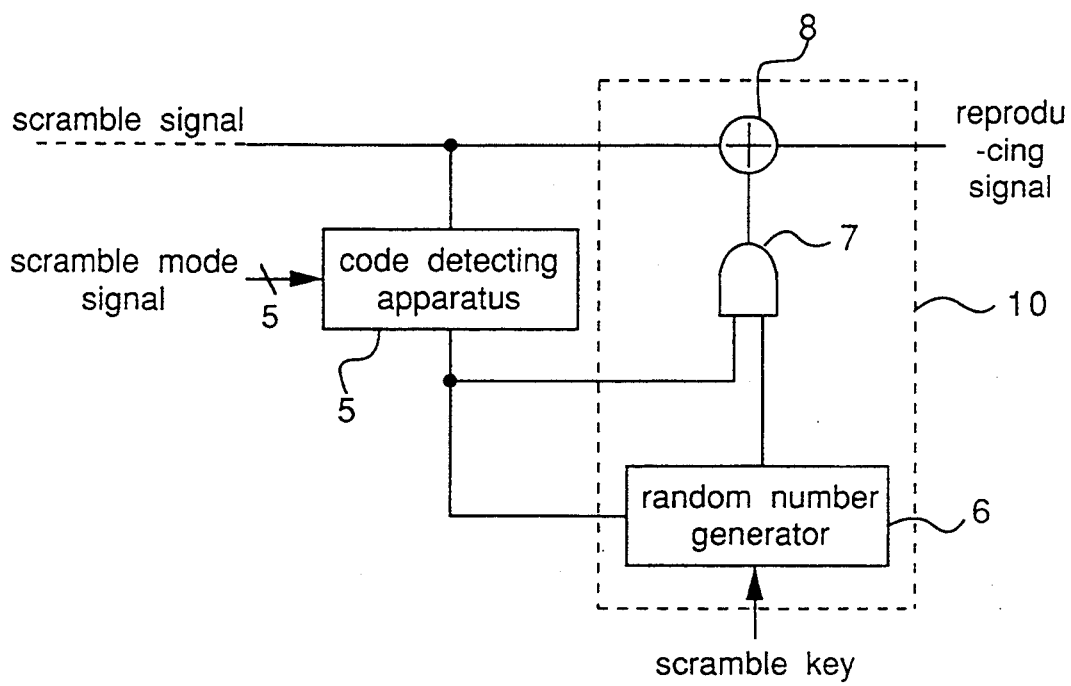

Before the description of the present invention proceeds, it is to be noted that like parts are designated by like reference numerals throughout the accompanying drawings.

FIG. 1 shows a scramble apparatus according to a first embodiment of the present invention.

Referring to FIG. 1, the scramble apparatus comprises code detectors 1 and 5 for reading a signal; random number generators 2 and 6; AND circuits 3 and 7; and exclusive OR circuits 4 and 8. A conversion circuit 9 for performing a conversion of inputted data comprises the random number generator 2, the AND circuit 3, and the exclusive OR circuit 4. An inverse conversion circuit 10 comprises the random number generator 6, the AND circuit 7, and the exclusive OR circuit 8.

The operation of the scramble apparatus having the above-described construction will be described below. An inputted signal is a video signal in conformity to MPEG (Moving Picture Expert Group) standard. MPEG standard is described in a specification and a draft such as ISO/IEC IS 11172(1993), ISO-IEC/JCTI/SC29/WG11 NO328: Test Model 3.

Figure 2:
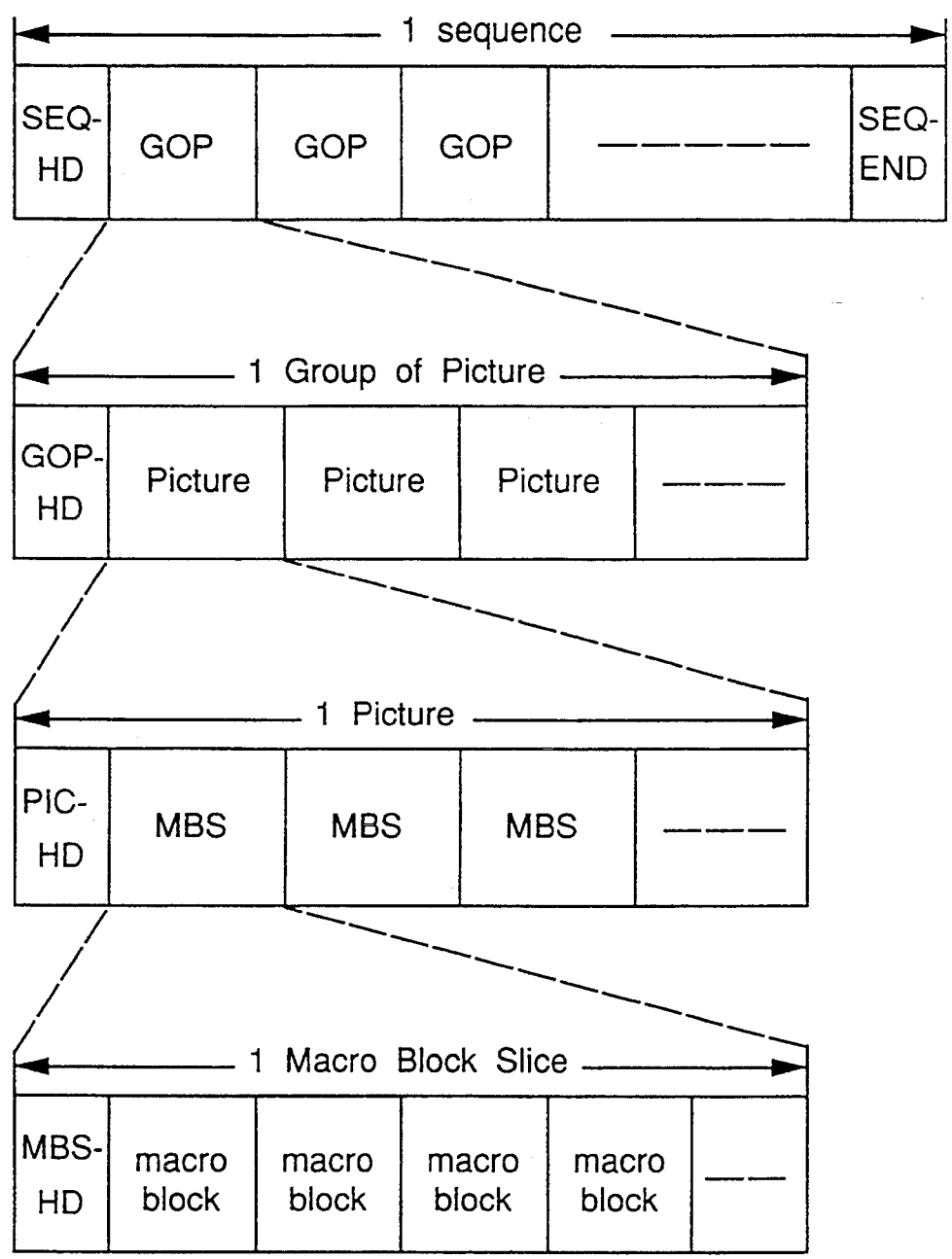
FIG. 2 is a view showing the outline of an image conforming to MPEG standard.

The outline of the video signal in conformity to MPEG is described below with reference to FIG. 2. As shown in FIG. 2, data construction comprises a sequence layer which indicates a motion image. A header portion includes a sequence head-discriminating signal serving as a start code, various kinds of parameters and data, one or more groups of picture (GOP), and coding data of the groups of picture (GOP).

The GOP layer comprising a frame of an arbitrary length includes the head discriminating signal serving as the start code of the GOP layer and coding data of one or more pictures. The picture layer includes the head discriminating signal of a picture serving as the start code of the picture and coding data of one or more slices. The slice layer can include one or more arbitrary macroblock, the head discriminating signal of the slice layer serving as the start code of the slice layer, and the coding data of one or more slices.

Figure 3:
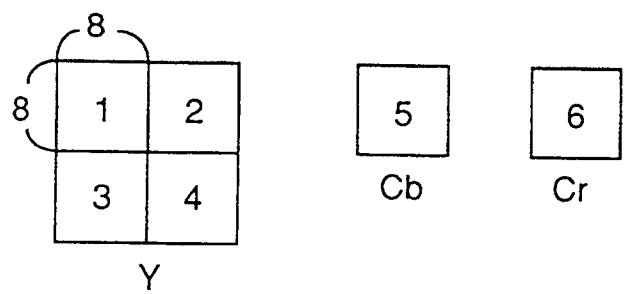
FIG. 3 is an explanatory view showing the construction of a block in a macroblock of a digital video signal in conformity to MPEG standard.
Figure 3:
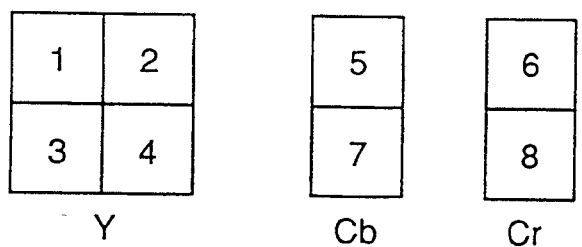
Figure 3:
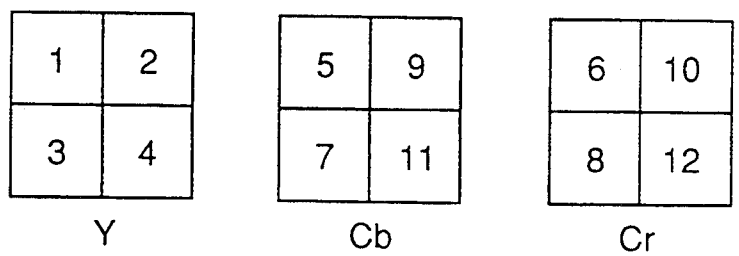

The macroblock is described below. The macroblock comprises a block of luminance 16×16 pixel and a chrominance corresponding thereto. Luminance (Y) and chrominance (Cb, Cr) are composed of several smaller blocks of 8×8 pixel which is a fundamental coding processing unit. FIG. 3 shows the structure of the macroblock. The number of blocks of the macroblock is as follows: When a signal to be processed is 4:2:0, the maximum number of blocks is 6 (luminance: 4, chrominance: 2); when a signal to be processed is 4:2:2, the maximum number of blocks is 8 (luminance: 4, chrominance: 4); when a signal to be processed is 4:4:4, the maximum number of blocks is 12 (luminance: 4, chrominance: 8). The data of each block is arranged in the order given in each block. When it is unnecessary to send data to a block in predictive image coding, for example, when a value obtained by quantizing an error by the predictive image coding is all zero, the macroblock is composed by skipping the block. That is, when a second block is skipped in a signal of 4:2:1, five blocks of 1, 3, 4, 5, and 6 are arranged to form the macroblock. When an n-th block is coded, the block is indicated by bn=1 (n=1, 2, ...). When the n-th block is not coded, the block is indicated by bn=0. A coded block pattern in the macroblock is indicated by "coded block pattern". In the case of the signal of 4:2:0, the signal is expressed by a binary number of 6 bits of coded block pattern=(b1, b2, b3, b4, b5, b6). The coded block pattern is coded in a variable length from 3 bits through 9 bits depending on appearance frequency. In the case of the signal of 4:2:2, the coded block pattern is expressed in a binary number of 8 bits of coded block pattern=(b1, b2, b3, b4, b5, b6, b7, b8)$_2$ and used as a code. In the case of the signal of 4:4:4, the coded block pattern is expressed in a binary number of 12 bits of coded block pattern=(b1, b2, b3, b4, b5, b6, b7, b8, b9, b10, b11, b12)$_2$ and used as a code. The signal of 4:4:4 exists in every macroblock. The macroblock includes blocks of predictive type or coding type and motion vectors. Each block includes the coding data of each discrete cosine transform (DCT) coefficient and most of the macroblocks are variable length codes.

The code detector 1 has a code book used to reproduce each code in order to read the content of all data of inputted bit string, thus detecting which information an inputted bit indicates. In particular, the code detector 1 detects a motion vector, a coded block pattern, "dct_dc_differential" code, "dct_coef_first", "dct_coef_next", and "quantizer_scale" code as the scramble point of the inputted signal (bit). The scramble point is described below.

The motion vector exists in each macroblock to be frame-to-frame predictive-coded. FIG. 4 is a code book showing the motion vector. According to the code book, a difference signal indicating the difference between a precedent motion vector and an actual motion vector is coded. The actual motion vector is obtained by adding a value read from the code book to the precedent motion vector.

As shown in FIG. 4, codes at positions symmetrical with respect to 0, namely, a positive code word and a negative code word obtained by inverting the positive code word are different from each other at the last one bit while the remaining bits thereof are equal to each other.

The code detector 1 detects the last bit of the motion vector as a scramble point except the case where the value of the motion vector is zero.

With regard to a signal of "coded block pattern", the last bit of a code is detected as a scramble point supposing that a signal to be processed is a signal of 4:2:0. In the case of "111", "01011", "01010", "01001", and "01000", the last bit of a code is not scrambled and thus not detected. FIG. 5 is a code book of coded block pattern used in the case where a signal is 4:2:0. As apparent from FIG. 5, except when a code is "111", all codes and codes obtained by inverting the last bit thereof exist in the code book. The numbers of "1" are equal to each other in all codes except the codes of "01011", "01010", "01001", and "01000" when the values of coded block pattern indicated by the codes are expressed by a binary number. Thus, an inputted signal is converted into a signal having a code length equal thereto, with a decoded position being erroneous in reproducing an original signal from the converted signal. For example, when the code of coded block pattern is converted from "1101" into "1100", a signal of a fourth block is reproduced as a signal of a third block.

The coefficient component of DCT is coded by using two-dimensional Huffman coding. That is, the combination of consecutive number (run) of zeros and a value (level), except zero, which follows the run is used to perform a scan according to a predetermined method after quantization is performed. FIG. 6 shows a part of the code book. Reference symbol (s) indicates a positive code or a negative code of the level. That is, a positive level indicates 0 and a negative level indicates 1. Accordingly, when the last bit of a detected code word is inverted, the inverted cord word exists in the code book, with the code of the level thereof inverted. Thus, regarding the coefficient component of DCT, the code detector 1 detects the two-dimensional code word of Huffman code as a scramble point.

Quantization scale exits as a 5-bit signal at a position immediately after the signal for discriminating the head of slice. The quantization scale exits as a 5-bit signal in the macroblock in altering the quantization scale of the macroblock in the slice. Since all 5-bit patterns correspond to the value of the quantization scale except the case where a 5-bit pattern has only zeros, even though a 5-bit signal is converted into any other 5-bit signals, a signal indicating a different value is generated. The code detector 1 detects the quantization scale as a scramble point when a currently inputted bit is a signal of the quantization scale.

A scramble mode signal to be inputted to the code detector 1 is a 5-bit signal indicating a motion vector, a coded block pattern, a DCT coefficient component, a DC component of DCT, and whether or not the quantization scale is scrambled. When each bit is "1", the quantization scale is scrambled while when each bit is "0", quantization scale is not scrambled. The combination of scramble mode is indicated by setting a plurality of bits to "1". The code detector 1 outputs a signal instructing the execution of scramble to the AND circuit 3 and the random number generator 2 when a scramble point is detected with the bit of the scramble instruction signal indicating "1".

In response to one scramble instruction signal, which is a one-bit pulse signal, the random number generator 2 generates a 1-bit random number in accordance with a rule determined by a scramble key, thus outputting the generated random number to the AND circuit 3. Therefore, when the instruction signal of five sequential bits are produced, random number generator 2 also generates five sequential bits of random numbers in response to the five sequential bits of the instruction signal. It is noted that the random number generator 2 generates random numbers at a bit rate equal to the bit rate of the input signal. Thus, the scrambling effected at the exclusive OR circuit 4 is carried out at every bit during which the AND circuit 3 is maintained opend by a HIGH level signal supplied thereto from the code detecting apparatus 1.

The AND circuit 3 allows the output of the random number generator 2 to pass therethrough only when the AND circuit 3 receives the scramble instruction signal from the code detector 1, thus outputting it to the exclusive OR circuit 4 so that the output of the AND circuit 3 is scrambled.

The receiving side having the same construction as the scramble apparatus descrambles a scramble signal. The function of the code detector 5 is identical to that of the code detector 1. In response to the scramble mode signal, the detector 5 outputs the scramble instruction signal to the random number generator 6 and the AND circuit 7. In this case, since the scramble signal maintains the grammar of MPEG even after the scramble is performed, the scramble instruction signal is capable of indicating the bit used at the time of the execution of the scramble. The function of the random number generator 6 is identical to that of the random number generator 2. Therefore, in response to the scramble key, the random number generator 6 generates the same random number as that generated in the execution of the scramble, thus outputting the generated random number to the AND circuit 7. In response to the output of the AND circuit 7, the exclusive OR circuit 8 applies the same random number as that used in the execution of the scramble to the scramble signal. In this manner, descramble processing is executed.

As described above, in the first embodiment, random numbers are added to the scramble signal with the last bit of the motion vector signal set as the scramble point. The scramble according to the first embodiment effectively deteriorates the quality of an image in a portion in which a projected image moves in a great amount. Since the scramble is performed in a code block pattern, a scramble image is obtained with a reproduction position located erroneously when the descramble processing is not performed. In addition, random numbers are added,to the last bit of the Huffman code of the DCT coefficient. As a result, the positive and negative signs of an error in predictive coding become random. Consequently, an image is obtained with the information of detailed portion thereof deteriorated. Luminance and hue of the DC component of DCT coefficient can be greatly deteriorated. The luminance level of an image can be effectively made to be random owing to the scramble of quantization scale. In the first embodiment, the code detector 1 detects of all of these scramble positions, and the scramble processing is switched by the scramble mode signal. In this manner, the scramble apparatus is capable of performing all scrambles and achieving the combination of each scramble.

In the first embodiment, an image data in conformity to MPEG standard is used, but it is possible to scramble data coded by other methods provided that a variable length code is used. FIG. 7 shows a code book of a motion vector code used in an advice plan H.261 of CCIR. Similarly to the first embodiment, in the case of the motion vector of H.261, the last bit of the motion vector can be detected as a scramble point with a similar effect.

Figure 8:
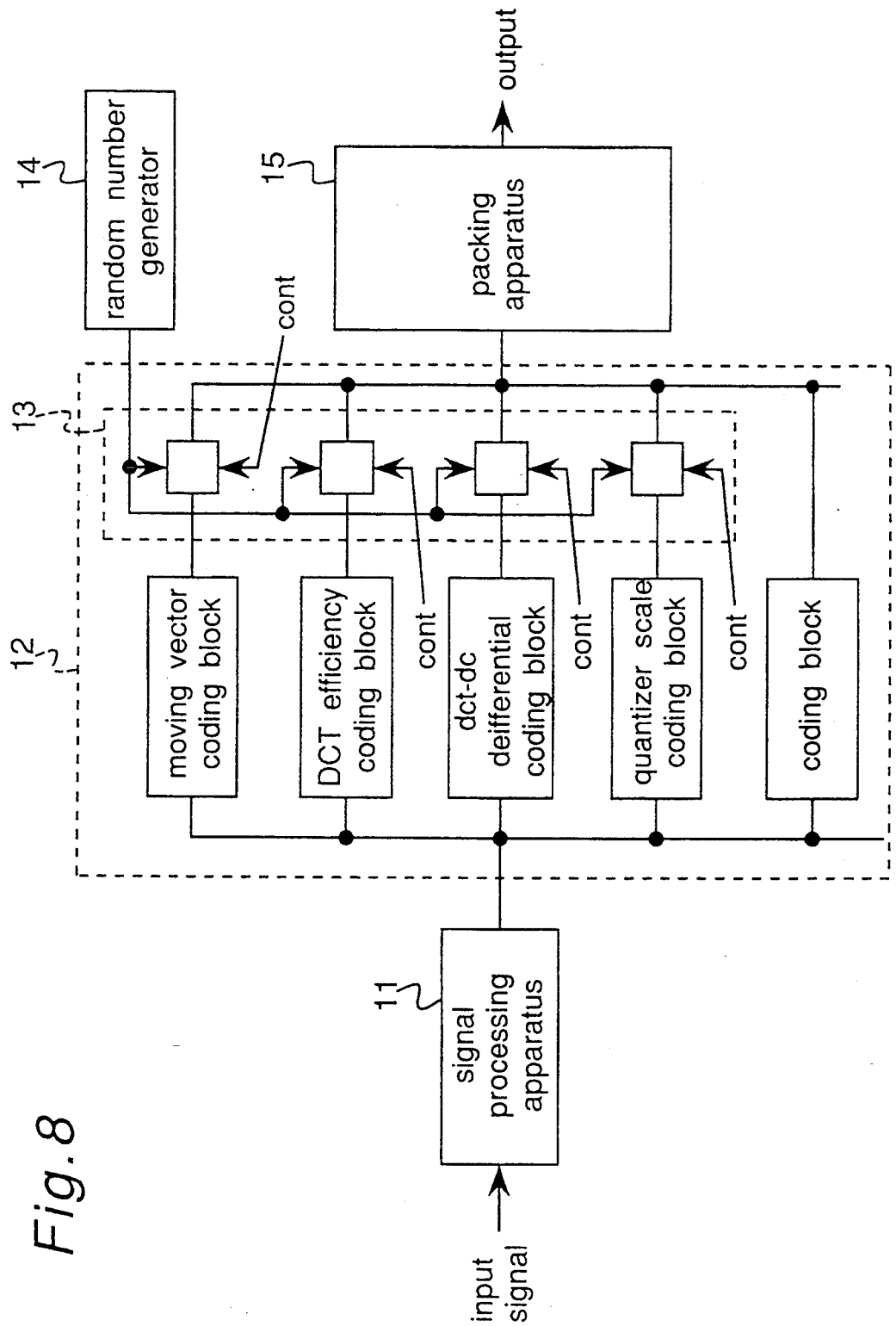
FIG. 8 is a block diagram showing the construction of a scramble apparatus according to a second embodiment of the present invention.

A scramble apparatus according to a second embodiment of the present invention is described below with reference to FIGS. 8 through 10. FIG. 8 shows the construction of the scramble apparatus according to the second embodiment.

Referring to FIG. 8, the scramble apparatus comprises a signal processing device 11 for converting a video signal such as DCT or a predictive processing into a parameter to be coded and quantizing a necessary video signal; a coder 12 for coding each parameter generated by the signal processing device 11; a bit inversion circuit 13 for performing an logical exclusive OR of a bit to be scrambled for each parameter by using a series of random numbers generated by a random number generator 14; and a packing device 15 for arranging coded data in a predetermined order, thus outputting the arranged data as a bit stream.

The operation of the scramble apparatus having the above-described construction is described below. Similarly to the first embodiment, the scramble apparatus generates a scramble signal for a signal conforming to MPEG standard. A signal is inputted to the signal processing device 11 of the scramble apparatus.

Figure 9:
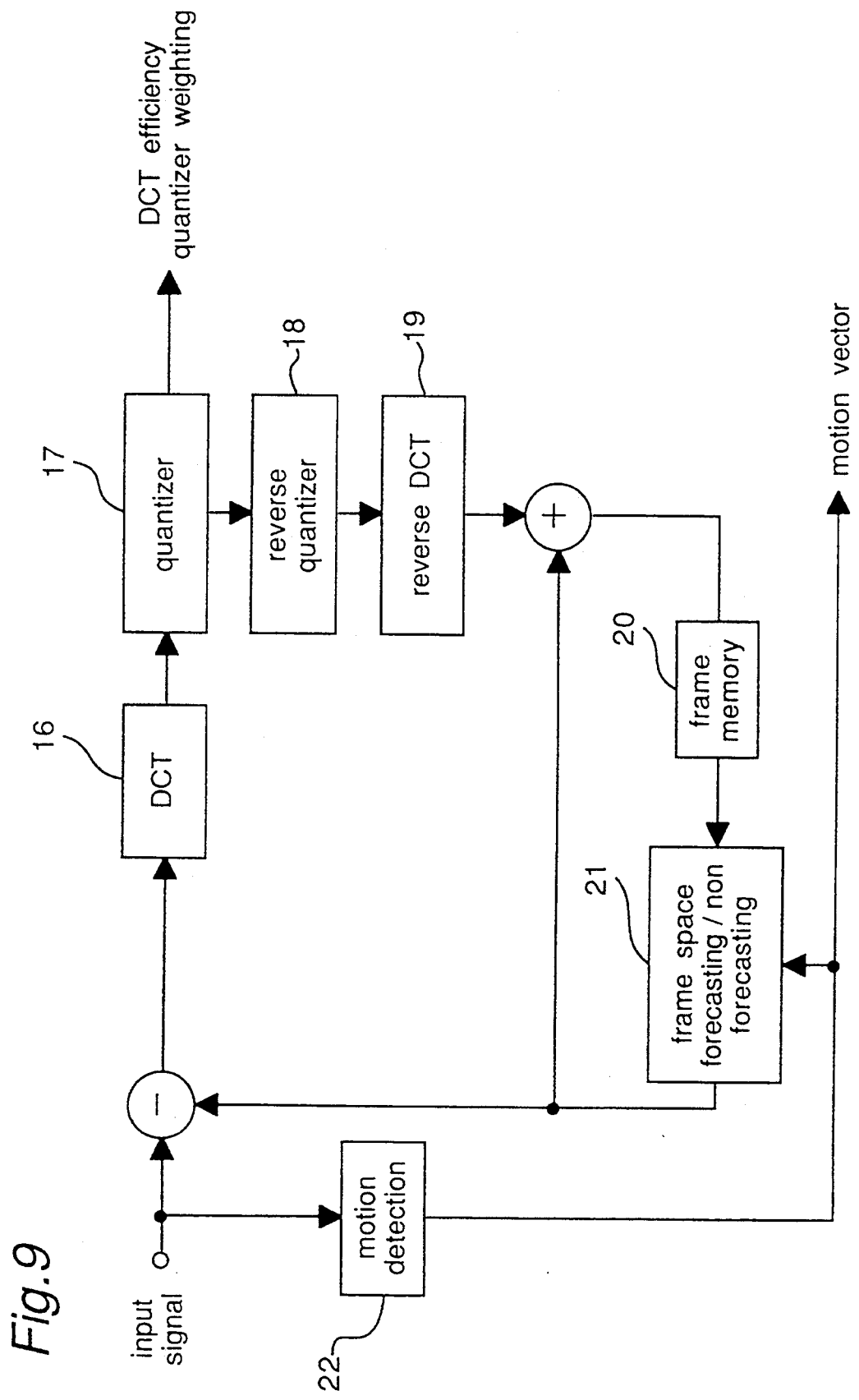
FIG. 9 is a block diagram showing a signal processor according to the second embodiment of the present invention.

FIG. 9 is a block diagram showing processing to be executed in the signal processing device 11. Referring to FIG. 9, the signal processing device 11 comprises a DCT processing block 16; a quantization processing block 17; an inverse quantization processing block 18; an inverse DCT processing block 19; a frame memory 20; frame-to-frame predictive/unpredictive block 21; and a motion detecting block 22. In the coding according to MPEG standard, the signal processing device 11 comprises three frames, namely, an intra-coded picture (I) frame for performing a coding in a frame, a predictive-coded picture (P) frame for performing a forward predictive coding based on a past frame, and a bidirectionally predictive-coded picture (B) frame for performing a predictive coding in combination of the forward predictive coding and a backward predictive coding based on a future frame.

In the (I) frame, an inputted signal is processed by the DCT processing block 16, quantized by the quantization processing block 17, and then sent to the coder 12. In the (P) frame, a quantized past frame is processed for reproduction by the dequantization processing block 18 and the inverse DCT processing block 19. If the signal is a prediction-difference signal, a predictive signal is added to the prediction-difference signal. The result obtained by the addition is stored in the frame memory 20. A motion is detected by the motion detecting block 22 based on a current frame. The predictive signal is generated by the frame-to-frame predictive/unpredictive block 21 based on the motion vector and a signal of the frame memory 20. A difference value between the predictive signal and the current frame is processed by the DCT processing block 16 and the quantization processing block 17.

In the (B) frame, the current frame is predicted based on not only the past frame used by the (P) frame but also on the future frame. Then, both predictions are synthesized to generate a predictive frame so as to perform a predictive coding similarly to the (P) frame. Thus, the signal processing device 11 outputs to the coder 12 data necessary for determining whether or not it is necessary to perform the weighting of quantized coefficient components and quantization, motion vector, predictive coding and the like. The coder 12 comprises coding blocks for coding data and the bit inversion circuit 13. Each data is inputted to a corresponding coding block for coding and each data coded in the order based on MPEG standard is transmitted to the packing device 15. The bit inversion circuit 13 is provided for a coding block which codes data to be scrambled.

Figure 10:
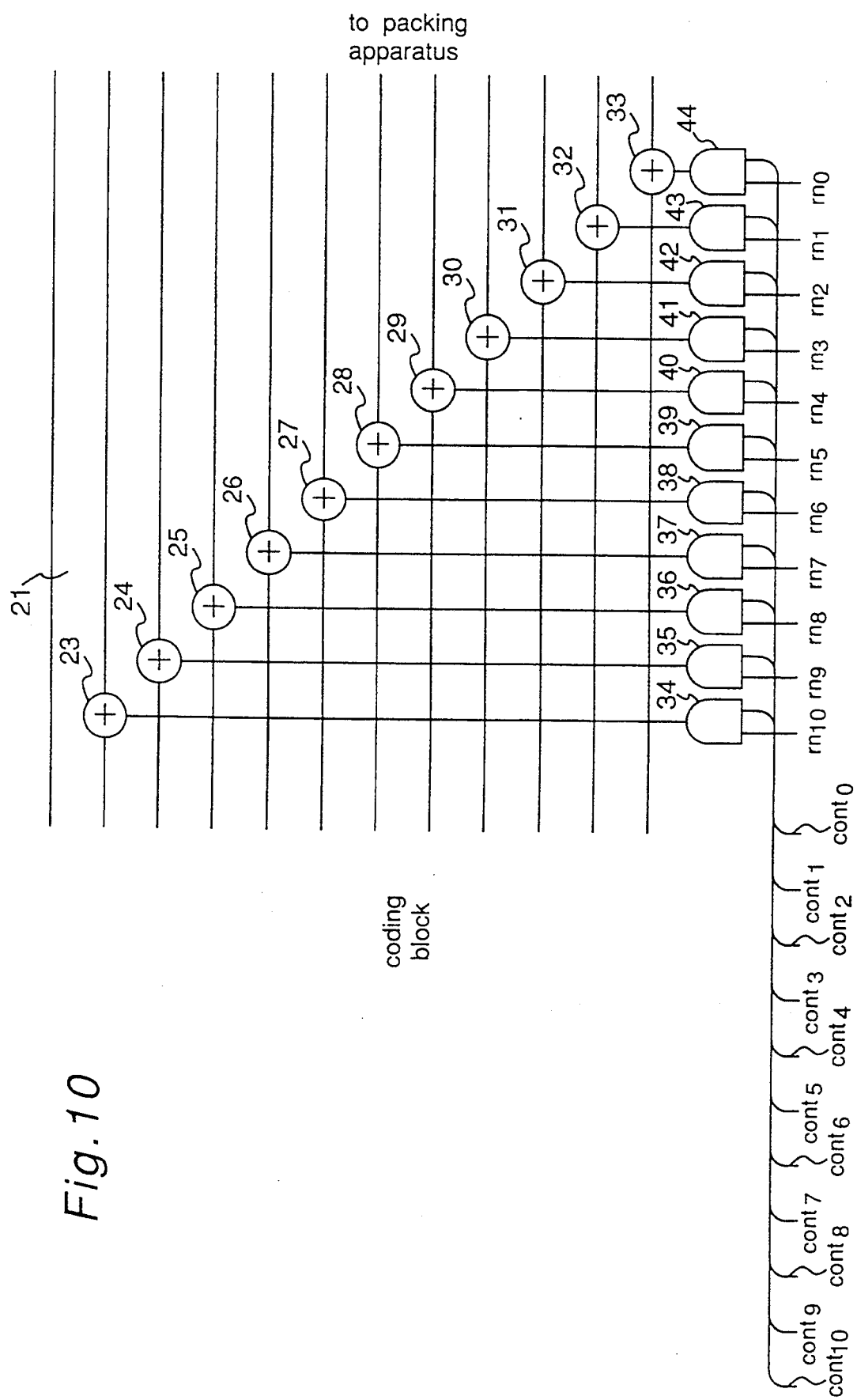
FIG. 10 is a block diagram showing a bit inversion means provided in a bit inversion device according to the second embodiment of the present invention.

The bit inversion circuit 13 is composed of a subcircuit, shown in FIG. 10, provided on each coding block which codes data to be scrambled.

Referring to FIG. 10, reference numerals 23 through 33 denote exclusive OR circuits. Reference numerals 34 through 44 denote AND circuits. A bus for transmitting data from each coding block to the packing device 15 comprises 32 bits. Exclusive OR circuits 23 through 33 are provided in the lower 11 bits of 32 bits so that a signal rn0 through rn10 outputted from the random number generator 12 can be applied to the bit inversion circuit 13. Data to be scrambled includes motion vector, Huffman coding of DCT coefficient, "dct_dc_differential" signal which is a difference signal of DC component of DCT, and quantization scale. Data sent from the coding block is sequentially applied to the bus from a lower bit. A signal outputted from the random number generator 14 is controlled for each bit by the AND circuits 34 through 44 and the inputs cont0 through cont10 supplied thereto.

In the case of a coding block of a motion vector, only a cont0 signal of a bit corresponding to the last bit is "1". In the case of a coding block which generates a Huffman code of DCT coefficient, only a signal of cont0 of cont0 through cont10 is "1" and other signals are "0" in performing scramble.

In the case of a signal of "dct_dc_differential", the bit number same as the bit length of the signal "dct_dc_differential" is "1" and based on a decoded result of a code, indicating a code length, existing immediately before the signal "dct_dc_differential", switching of cont0 through cont10 is effected. In a coding block of quantization scale, cont0 through cont4 are "1". Therefore, a code to be scrambled is bit-inverted by a random number generated by the random number generator 14. A random number is added to the scramble signal in such a manner that the order generated by the random number generator 14 is equal to the appearing order of a code to which the random number has been added in a bit stream conversion. Cont0 through cont 10 are inputted by finding cont0 through cont 10 for each coding block based on scramble mode.

Each code scrambled as above is sent to the packing device 15 under the control of the coder 12. The packing device 15 connects the codes to each other in the order of the code in conformity to MPEG standard, thus outputting the connected codes as a bit stream.

As described above, in the second embodiment, simultaneously with a signal coding, scramble processing is executed. Therefore, compared with a construction in which coding is performed and then a bit stream is scrambled, the apparatus of the first embodiment eliminates the provision of detector for detecting a code to be scrambled and can generate a scramble signal efficiently.

In the second embodiment, in the coding block, simultaneously with a signal coding, scramble processing is executed. But if there are a small number of patterns, for example, motion vectors to be scrambled, a table for coding scrambled data and a table for coding data not scrambled may be prepared. In this case, a selective control can be made by using a random number.

Figure 11:
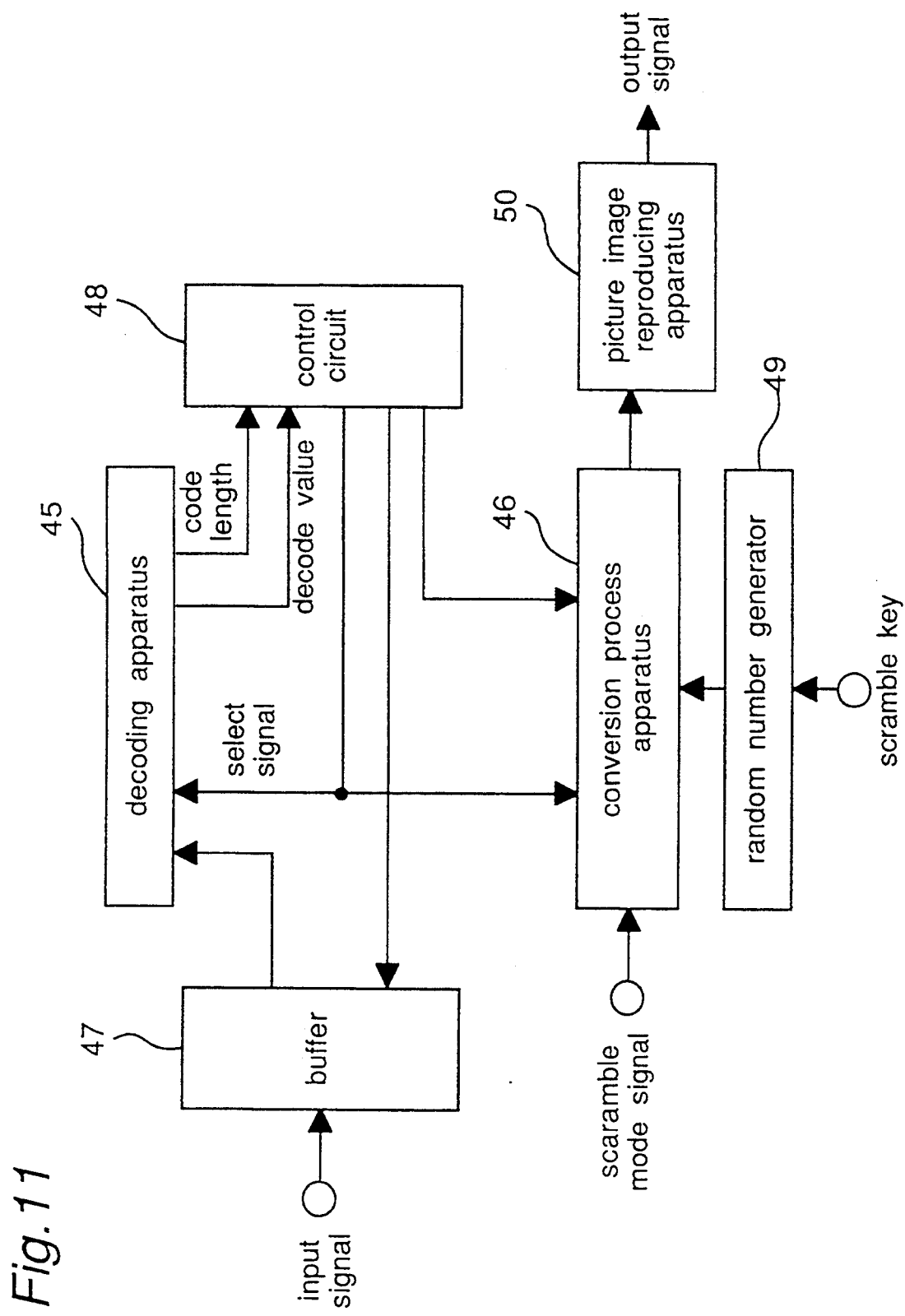
FIG. 11 is a block diagram showing the construction of a descramble apparatus according to a third embodiment of the present invention.

A descramble apparatus according to the third embodiment of the present invention is described below with reference to FIG. 11 showing the construction thereof. The scramble signal generated by the scramble apparatus according to the second embodiment is inputted to the descramble apparatus. The descramble apparatus comprises a decoder 45 for decoding each code of an inputted signal; a conversion processor 46 for converting decoded data into a correct reproduction signal; a buffer 47; a control circuit 48 for controlling an output of the buffer 47 and controlling the decoder 45 by distinguishing the kind of a signal and selecting a table appropriate for decoding; a random number generator 49 for generating random numbers based on the scramble key and controlling the conversion processor 46 based on the output thereof; and an image reproducing device 50.

The operation of the scramble apparatus having the above-described construction is described below. The buffer 47 outputs a signal inputted thereto to the decoder 45 according to a signal of the control circuit 48. The decoder 45, comprising a decoding processing section for decoding each code of a video signal and a code book table, alters the content of the code table according to a table select signal transmitted from the control circuit 48 and decodes a received signal with reference to the code book table, thus outputting the decoded value to the control circuit 48 and the conversion processor 46 and outputting a code length signal to the control circuit 48. In response to the decoded value and the code length signal outputted from the decoder 45, the control circuit 48 outputs a decoded code length signal to the buffer 47 and shifts the decoded code length signal by the bit number of the decoded code length signal so as to allow the decoder 45 to receive a signal. In addition, the control circuit 48 recognizes a signal which will be inputted thereto based on the rule of a series of signals in conformity to MPEG standard as well as obtained decoded result, thus outputting a select signal indicating a code to be decoded by the decoder 45 to the decoder 47. In this manner, the control circuit 48 makes a control so that a correct table can be used in decoding. In addition, the control circuit 48 outputs the information of a decoded signal to the conversion processor 46. In response to the output of the control circuit 48 and the scramble mode signal, the conversion processor 46 discriminates whether or not data should be scrambled. The conversion processor 46 performs a conversion of a code to be scrambled in response to the output of the random number generator 49 by using the scramble key, thus outputting the result to the image reproducing device 50. If data received by the conversion processor 46 should not be scrambled, the conversion processor 46 outputs it to the image reproducing device 50 without decoding it. Regarding the processing of motion vector to be performed in the conversion processor 46, when the output of the random number generator 49 is 1, a decoded value of x is inverted into −x as shown in the code book of FIG. 4. When the output of the random number generator 49 is 0, processing is not performed. Regarding the processing of two-dimensional Huffman code of DCT coefficient, when the output of the random number generator 49 is 1, the code of a value of a decoded level is inverted. When the output of the random number generator 49 is 0, processing is not performed. In the case of "dct_dc_differential" signal and the quantization scale, a random number is applied to all bits. In this manner, based on data decoded and descrambled, the image reproducing apparatus 50 reproduces an image.

As described above, the control circuit of a normal reproducing device not scrambled has a function of detecting the scramble processing section and descramble processing is performed by the reproducing section. Unlike the conventional apparatus in which both descramble processing section and data reproducing section required a code book for reading a variable length code of data, the decoder 45 of the reproducing section of the apparatus according to the present invention is capable of performing descramble processsing and the reading of the variable length code of data. Therefore, descramble processing can be executed by a compact circuit.

Figure 12:
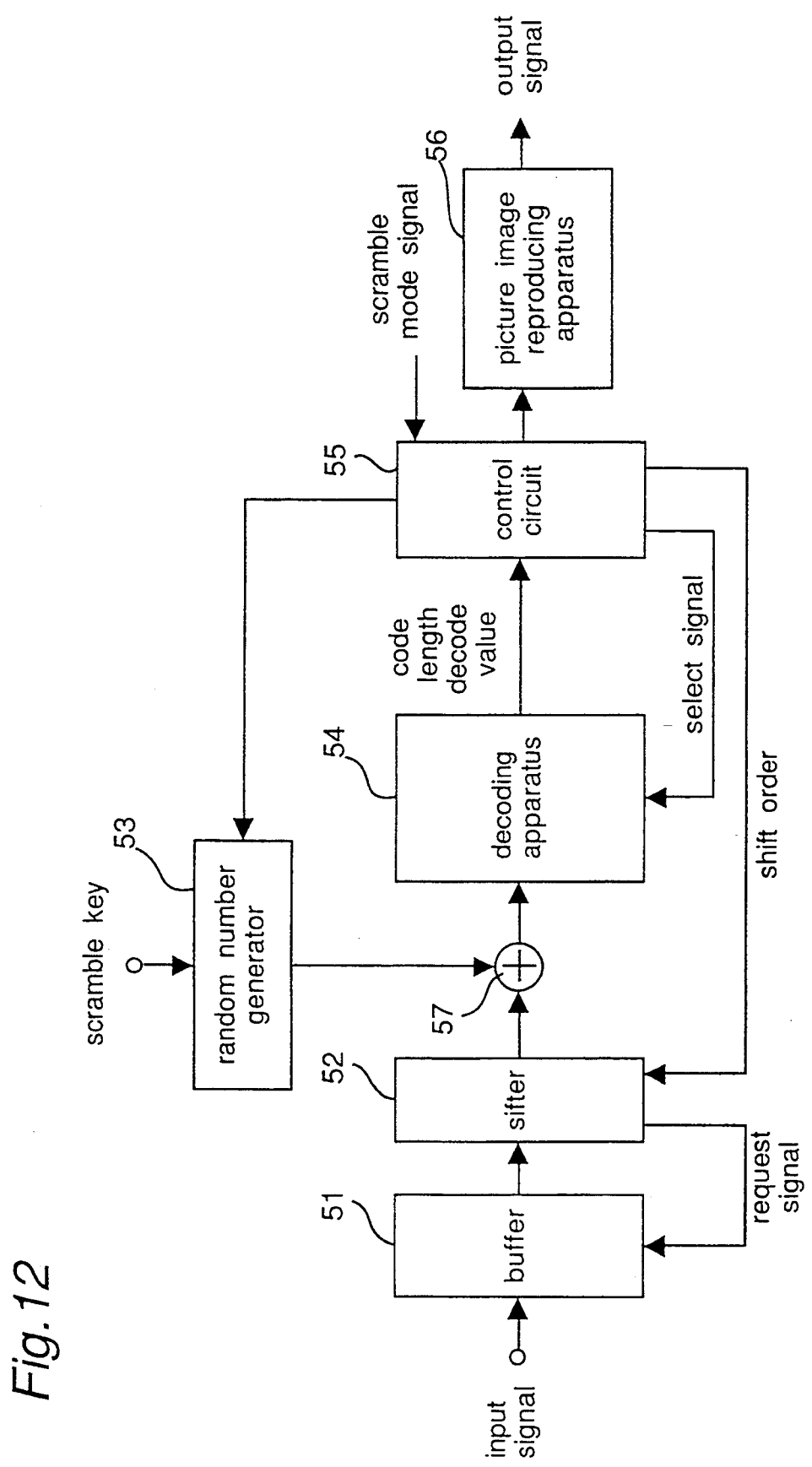
FIG. 12 is a block diagram showing the construction of a descramble apparatus according to a fourth embodiment of the present invention.

A descramble apparatus according to the fourth embodiment of the present invention is described below with reference to FIG. 12. The descramble apparatus comprises a buffer 51 for storing an inputted signal temporarily; a shifter 52 for shifting the received signal by the processed number of bit, thus outputting the result to an exclusive OR circuit 57; a random number generator 53 for generating a series of random numbers identical to that used in scramble; a decoder 54 for decoding each code of an inputted signal; a control circuit 55 for controlling the respective devices based on a value decoded by the decoder 54; an image reproducing device 56; and the exclusive OR circuit 57.

The operation of the descramble apparatus having the above-described construction is described below. An inputted signal is the same as that of the third embodiment. The inputted signal is stored in the buffer 51 which outputs a predetermined number of bits to the shifter 52 each time the buffer 51 receives a request signal from the shifter 52. The shifter 52 shifts the inputted signal according to an instruction sent from the control circuit 55 and outputs constant bits in parallel with a bit to be decoded next at the head thereof to the exclusive OR circuit 57. When the number of bits stored in the shifter 52 becomes less than a predetermined bit, the shifter 52 outputs a request signal to the buffer 51. The output of the shifter 52 passes through the exclusive OR circuit 57 without being processed and inputted to the decoder 54. The decoder 54 comprises a decoding processing section and a code book. That is, the decoder 54 performs decoding by appropriately selecting an inputted code book and a decoding processing based on a select signal sent from the control circuit 55, thus outputting a decoded value and a code length to the control circuit 55. In addition, the decoder 54 outputs the bit information of a code to be scrambled to the control circuit 55. The control circuit 55 outputs a decoded value to the image reproducing device 56 if the decoded code is not to be scrambled and outputs an instruction for the shift of the code length of the decoded code to the shifter 52. If a decoded code is to be scrambled, the control circuit 55 sends a control signal to the random number generator 53 in response to the signal outputted from the decoder 54 so that the exclusive OR circuit 57 performs an logical exclusive OR by using a series of random numbers generated by the random number generator 53. At this time, the control circuit 55 does not send a shift signal to the shifter 52 so that the same signal is outputted again from the shifter 52. The signal outputted again from the shifter 52 is descrambled by the exclusive OR circuit 57, correctly decoded by the decoder 54, and outputted to the control circuit 55. The control circuit 55 transmits a correctly decoded signal to the image reproducing device 56 and an instruction for shifting the code length of the decoded signal to the shifter 52. The image reproducing device 56 executes a signal processing such as an inverse DCT based on a decoded value supplied by the control circuit 55.

As described above, in the fourth embodiment, the decoder 54 decodes each code included in an inputted scramble signal and the control circuit 55 detects a scrambled portion based on the result produced by the decoder 54. Upon receipt of the detected result, the random number generator 53 and the exclusive OR circuit 57 release the scramble and then, the decoder 54 decodes the received code again. In this manner, the scramble signal is descrambled. Accordingly, the number of decoding and that of code books are small and in addition, descramble processing is performed before each code is decoded. Thus, the apparatus of the fourth embodiment executes the descramble processing faster than the third embodiment.

Figure 13:
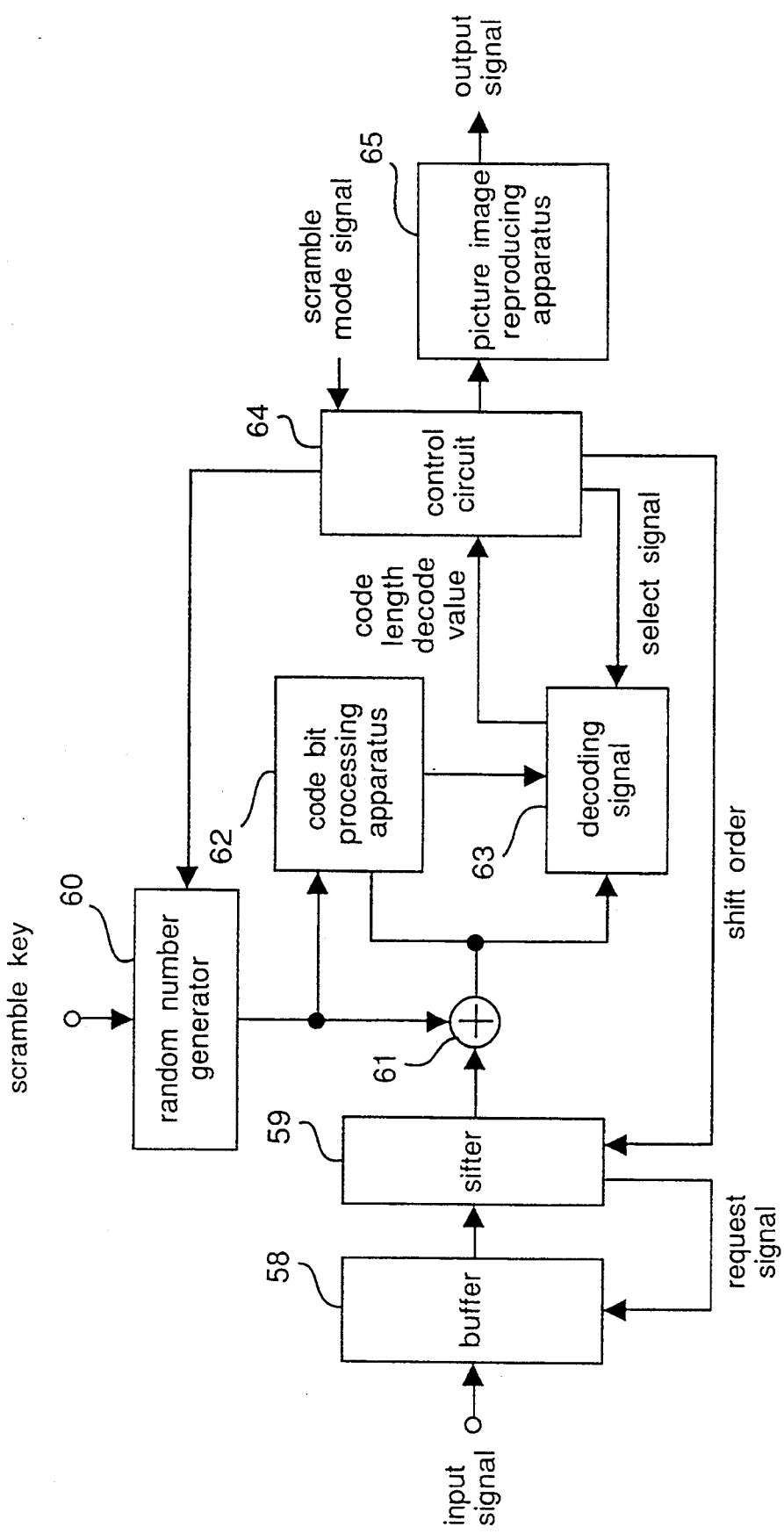
FIG. 13 is a block diagram showing the construction of a descramble apparatus according to a fifth embodiment of the present invention.

A descramble apparatus according to the fifth embodiment of the present invention is described below with reference to FIG. 13. The descramble apparatus comprises a buffer 58 for storing an inputted signal temporarily; a shifter 59 for shifting the received signal by thee processed number of bit, thus outputting the result to an exclusive OR circuit 57; a random number generator 60 for generating a series of random numbers identical to those in scramble; the exclusive OR circuit 61 for performing an logical exclusive OR by using a series of random numbers generated by the random number generator 60; a sign bit processor 62 for reproducing a sign bit; a decoder 64 for decoding each code of an inputted signal; a control circuit 55 for controlling the respective devices based on inputted signals and outputting a decoded result; and an image reproducing device 65 for reproducing an image based on the result of decoding.

The operation of the descramble apparatus having the above-described construction is described below. An inputted signal is the same as that of the third embodiment. The inputted signal is stored in the buffer 58 which outputs a predetermined number of bits to the shifter 59 each time the buffer 51 receives a request signal from the shifter 59. The shifter 59 shifts the inputted signal according to an instruction sent from the control circuit 64 and outputs constant bits in parallel with a bit to be decoded next at the head thereof to the exclusive OR circuit 61. When the number of bits stored in the shifter 59 becomes less than a predetermined bit, the shifter 59 outputs a request signal to the buffer 58. Based on a decoded value and a signal indicating the code length thereof supplied by the decoder 63, the control circuit 64 outputs an instruction to the shifter 59 so that the bit length processed by the shifter 59 is shifted. In addition, based on a signal supplied by the decoder 63, the control circuit 64 detects a scrambled portion, thus controlling the random number generator 60 and the sign bit processor 62. The control method to be performed by the control circuit 64 is described below. Regarding "dct_dc_differential" signal, based on the decoding information of "dct_dc_size_luminance" signal or dct_dc_size_chrominance" signal indicating a code length immediately before the "dct_dc_differential" signal, the control circuit 64 outputs a signal to the random number generator 60 so that the exclusive OR circuit 61 performs an logical exclusive OR of signals sequentially from a signal at the head of a series of signals to be outputted from the shifter 59 according to the decoding information which indicates bits necessary to be decoded. Regarding the quantization scale, when it is recognized that bits of fixed length code are decoded sequentially and quantization scale is inputted next, the random number generator 60 is controlled so that random numbers are applied to the calculation of the logical exclusive OR of the next five bits. Regarding the coefficient component of DCT, the decoder 63 is provided with a code book for restoring the information of bit patterns prior to a sign bit. The decoding signal indicating the information of bit patterns is sent to the control circuit 64. The control circuit 64 detects the next 1 bit as a sign bit and allows the sign bit processor 62 to be operable and transmits a control signal to the random number generator 60 and transmits random numbers to the sign bit processor 62. Only when the random number is "1", the sign bit processor 62 inverses the sign bit, thus outputting the inverted sign bit to the decoder 63. The decoder 63 generates a decoding signal based on the sign bit and the value of a decoded portion, thus outputting the generated decoding signal to the control circuit 64. In the case of the motion vector, there is provided, in the decoder 63, a code book of pattern in which the sign bit of a code indicating the value of motion vector shown in FIG. 4 is excluded. The decoder 63 decodes codes, thus sending the decoded values and the code lengths to the control circuit 64. The control circuit 64 decides the following one bit as a sign bit and allows the sign bit processor 62 to be operable and sends a control signal to the random number generator 60. The random number generator 60 sends random numbers to the sign bit processor 62. The sign bit processor 62 inverses a sign bit only when the random number is "1", thus outputting the result to the decoder 63. Then, the control circuit 64 outputs a control signal to the shifter 59 so that a subsequent expansion code is inputted to the decoder 63. Based on the decoded value and the expansion code of the sign bit, the decoder 63 generates a correct decoding signal, thus outputting the decoding signal to the control circuit 64. The correctly decoded value is transmitted to the image reproducing device 65. The control circuit 64 allows the decoder 63 to select the code book similarly to the first embodiment.

As described above, based on a previous code decoded by the decoder 63, the control circuit 64 detects a scrambled portion of a code to be processed and the scramble is released and a reproduction is effected by the random number generator 60, the exclusive OR circuit 61, the sign bit processor 62. As a result, only one code book for reading a variable length code is required in the decoder 63. Thus, similarly to the first and third embodiments, a compact circuit is used. In addition, since it is unnecessary to refer to the code book twice unlike the fourth embodiment, a high speed processing can be accomplished. Further, since the code book used in the decoder 63 does not require sign bit, it is unnecessary to store a large number of memories.

Figure 14:
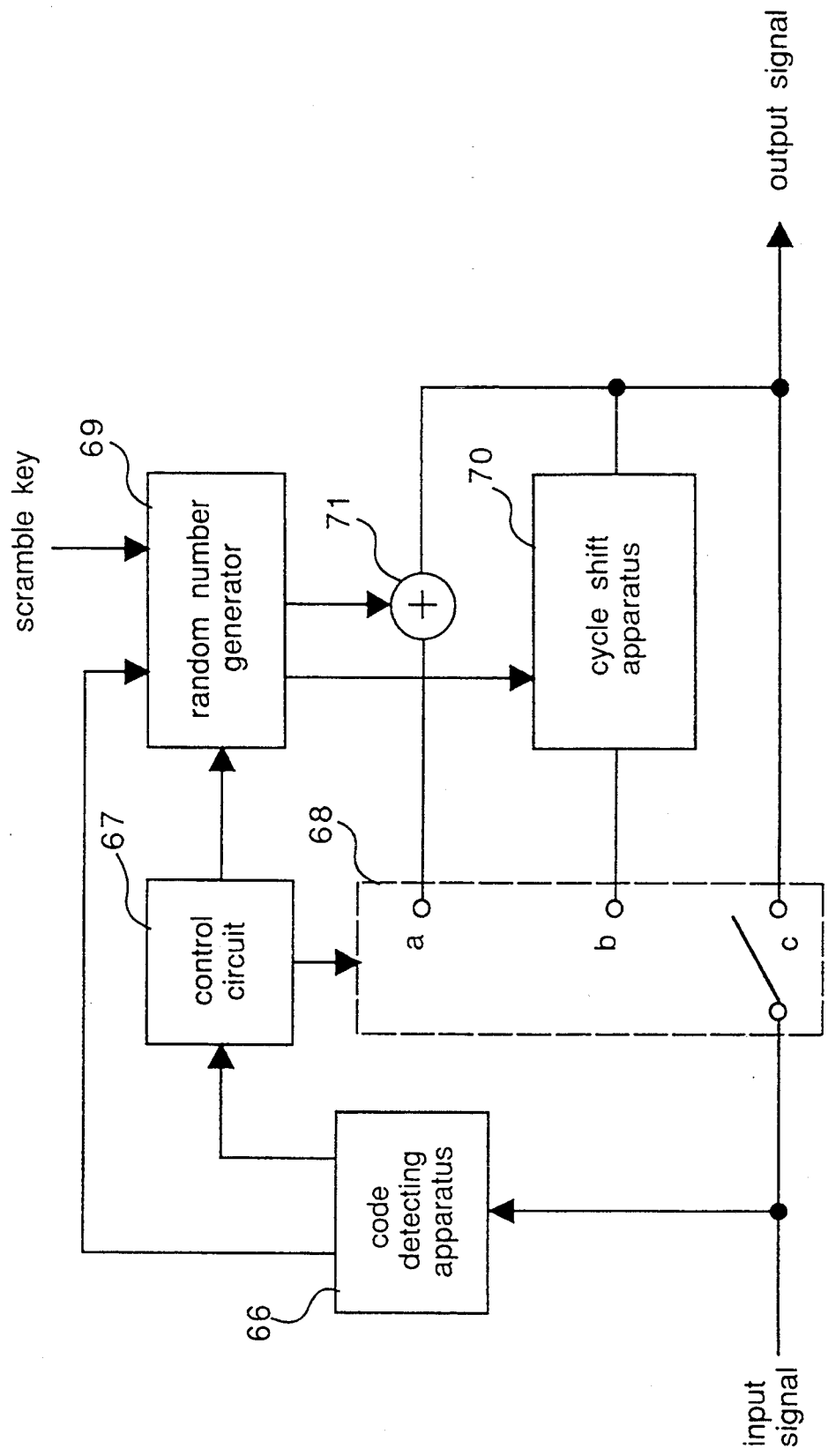
FIG. 14 is a block diagram showing the construction of a scramble apparatus according to a sixth embodiment of the present invention.

A scramble apparatus according to the sixth embodiment of the present invention is described below with reference to FIG. 14. The scramble apparatus comprises a code detector 66 for distinguishing inputted signals from each other and reading the bit number of a signal; a control circuit 67 for determining whether or not the current code of an inputted signal is scrambled, based on the result detected by the code detector 66 and controlling ON and OFF of the scramble; a signal change-over device 68 for switching processings of inputted signals from each other based on the output of the control circuit 67; a random number generator 69; a cyclic shifter 70 for performing a cyclic shift according to the output of the random number generator 69; and an exclusive OR circuit 71.

The operation of the scramble apparatus having the above-described construction is described below. The code detector 66 has a code-reproducing code book for reading the contents of all data of inputted signals and detecting the information indicated by an inputted bit, thus outputting the information to the control circuit 67. When the coded block pattern signal is detected, the control circuit 67 selects processing as a code to be scrambled according to a signal supplied by the code detector 66 and controls the signal change-over device 68, thus outputting a control signal indicating the output of a random number necessary for scramble to the random number generator 69. The method to be performed by the control circuit 67 is described below.

When a code not to be scrambled is detected, the control circuit 67 allows the signal change-over device 68 to output a signal indicating that an inputted signal is connected to a terminal (c), and the inputted signal is outputted from the signal change-over device 68 without being processed. When a "coded block pattern" signal of inputted signals is detected, the control circuit 67 sends an instruction that the "coded block pattern" signal is connected with a different terminal to the signal change-over device 68 so as to scramble the signal is scrambled, thus outputting an instruction to the random number generator 69 so that the random number generator 69 generates random numbers. When a signal to be processed is 4:2:0, the control circuit 67 outputs a control signal to the signal change-over device 68 so that the inputted signal is connected to the terminal (a). Then, the control circuit 67 outputs the information of the code length of the signal and an instruction of generating a random number of 1 bit to the random number generator 69. In response to the output of the control circuit 67, the random number generator 69 outputs the random number of 1 bit to the exclusive OR circuit 71 by using the scramble key so that the random number of 1 bit is applied to the last bit of the code. In the case of "111", "01011", "01010", "01001", and "01000", the code is not scrambled and the inputted signal is connected with the terminal (c) of the signal change-over device 68. When a signal to be processed is 4:2:2 or 4:4:4, the control circuit 67 outputs a control signal to the signal change-over device 68 so that the inputted signal is connected to the terminal (b) of the signal change-over device 62 and in addition, the control circuit 67 outputs an instruction to the random number generator 69 so that the random number generator 69 generates a random number of four bits. The random number generator 69 generates the random number of four bits by using the scramble key, thus transmitting the random number of four bits to the cyclic shifter 70. The cyclic shifter 70 cyclically shifts the code of the coded block pattern by the number of times indicated by the signal outputted from the random number generator 69, thus outputting the result. Similarly to the signal of 4:2:0, the length of the code is equal to that of an original code and the position of each block is converted into an erroneous position. The signal generated as above is inserted into the code position of the original "coded block pattern" and outputted from the scramble apparatus.

As described above, the codes of "111", "01011", "01010", "01001", and "01000" are not processed in the case the signal of 4:2:0. Random numbers are applied to the last bit of the remaining codes for a code change in such a manner that the code length of a scrambled signal is equal to that of a signal not scrambled and the number of blocks remain unchanged. The cyclic shifter 70 cyclically shifts the code of the coded block pattern in the case of the signal 4:2:2 or 4:4:4. Thus, the number of "1" in the code remains unchanged and hence signal processing can be accomplished easily. Since the predictive coding is used in the coding method of MPEG standard, the position of a block is moved in a reproduced signal and a predictive error signal is added to a predicted value. Hence, scramble processing can be effectively performed.

Figure 15:
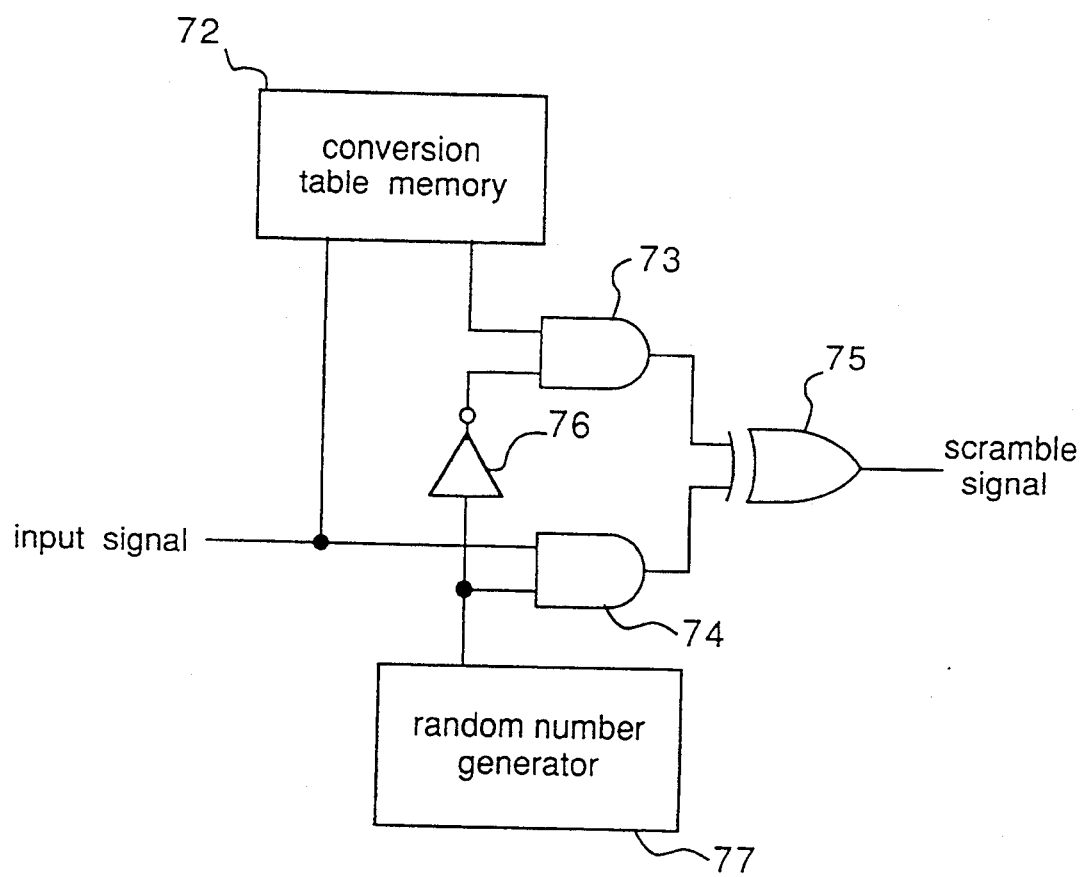
FIG. 15 is an explanatory view showing an example of the construction in which a conversion table is used in scramble conversion.

In the sixth embodiment, when a part of a variable length code word is bit-inverted, random numbers are applied to a bit which corresponds to a code word provided in the code book. But in converting a code word into a code worn without changing the code length, not only the conversion table may be utilized to replace the entire code word with a different code word, but also any other means may be employed. FIG. 15 shows an example of the construction of an apparatus when a conversion table is used. The apparatus comprises a conversion table 72; AND circuits 73 and 74; an exclusive OR circuit 75; a NOT circuit 76; a random number generator 77. In this construction, the random number generator 77 is controlled in deciding whether an inputted signal is converted into a scramble signal or not processed.

In the sixth embodiment, data in conformity to MPEG standard is inputted to the apparatus, but data including a variable length word such as compression image data or a sound signal can be handled. According to the present invention, not only a scrambled parameter, but also data including a variable length word can be scrambled without increasing the code length thereof. Since a standardized operation has been continuously performed, scramble can be accomplished in a similar method in standardized MPEG 1 and MPEG 2 although the specification of MPEG standard may be altered in some extent. Although data of a variable length code may be altered in MPEG standard in future, scramble can be performed with attention paid to each parameter.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A scramble transmission apparatus comprising a scramble apparatus for scrambling compression image data and a descramble apparatus for restoring a scramble signal generated by the scramble apparatus to a signal not scrambled, wherein said scramble apparatus selects at least one of coded parameters of:

(i) a motion vector obtained by predictive-coding the image data with the motion of the vector compensated, (ii) a coding block pattern signal indicating whether each coded block contained in a block group has been coded, or not, in which said block group in an image data is defined by plural coded blocks and each coded block defined by plural pixel data, (iii) a two-dimensional Huffman code of DCT coefficient which has been coded by two-dimensional Huffman method using run and level obtained by a predetermined scanning along the coefficients aligned in two orthogonal directions as a result of prediction-applied DCT conversion;

(iv) a DC component of DCT coefficients obtained after said prediction-applied DCT conversion; and (v) a code indicating how the image data has been quantized in coding;

and wherein said scrambled apparatus includes a conversion processing device for scrambling the selected parameters; and the descramble apparatus performs a conversion inverse to the conversion performed by the scramble apparatus.

2. A scramble apparatus comprising a conversion processing device which selects at least one of coded parameters of:

(i) a motion vector obtained by predictive-coding the image data with the motion of the vector compensated, (ii) a coding block pattern signal indicating whether each coded block contained in a block group has been coded, or not, in which said block group in an image data is defined by plural coded blocks and each coded block defined by plural pixel data, (iii) a two-dimensional Huffman code of DCT coefficient which has been coded by two-dimensional Huffman method using run and level obtained by a predetermined scanning along the coefficients aligned in two orthogonal directions as a result of prediction-applied DCT conversion;

(iv) a DC component of DCT coefficients obtained after said prediction-applied DCT conversion; and (v) a code indicating how the image data has been quantized in coding;

and said conversion processing device for scrambling the selected parameters.

3. A scramble apparatus as defined in claim 2, wherein a motion vector of the image data obtained by predictive-coding the image data with the motion of the vector compensated is selected as a parameter to be scrambled.

4. A scramble apparatus as defined in claim 3, wherein the conversion processing device comprises a bit-inversion device for bit-inverting a sign bit of the motion vector of the image data.

5. A scramble apparatus as defined in claim 2, wherein the conversion processing device obtains one coded block from data of a plurality of pixels; selects, as a parameter to be scrambled, a coding block pattern signal indicating whether each coded block contained in a block group has been coded, or not, in which said block group in an image data is defined by plural coded blocks and each coded block defined by plural pixel data; and converts the selected parameter into the coded block pattern signal indicating the case in which the number of coded blocks is equal to that of blocks coded in each block group indicated by the selected coded block pattern signal.

6. A scramble apparatus as defined in claim 5, wherein the conversion processing device is further for converting a selected code, which is selected as a parameter for scrambling, and coded according to the MPEG standard, to another code such that the number of "1s" contained in the "cbp" of the another code is the same as the number of "1s" contained in the "cbp" of the selected code.

7. A scramble apparatus as defined in claim 2, wherein the conversion processing device is further for selecting a two-dimensional Huffman code of DCT coefficient which has been coded by two-dimensional Huffman method using run and level obtained by a predetermined scanning along the coefficients aligned in two orthogonal directions as a result of prediction-applied DCT conversion; and inverting a sign bit indicating the sign of the selected code from positive to negative and vice versa.

8. A scramble apparatus as defined in claim 2, wherein the conversion processing device is further for selecting, as a parameter to be scrambled, a "dct_dc_differential" signal of the image data; and scrambling the selected parameter.

9. A scramble apparatus as defined in claim 2, wherein the conversion processing device is further for selecting the code indicating how the image data has been quantized in coding the image data as a parameter to be scrambled; and scrambling the selected parameter.

10. A scramble apparatus as defined in claim 9, wherein the conversion processing device is further for selecting, as a parameter to be scrambled, a quantization scale included in the image data; and scrambling the selected parameter.

11. A descramble apparatus comprising an inverse conversion device performing an inverse conversion which selects at least one of coded parameters of:

(i) a motion vector obtained by predictive-coding the image data with the motion of the vector compensated, (ii) a coding block pattern signal indicating whether each coded block contained in a block group has been coded, or not, in which said block group in an image data is defined by plural coded blocks and each coded block defined by plural pixel data, (iii) a two-dimensional Huffman code of DCT coefficient which has been coded by two-dimensional Huffman method using run and level obtained by a predetermined scanning along the coefficients aligned in two orthogonal directions as a result of prediction-applied DCT conversion;

(iv) a DC component of DCT coefficients obtained after said prediction-applied DCT conversion; and (v) a code indicating how the image data has been quantized in coding;

and descrambles the selected parameter.

12. A descramble apparatus as defined in claim 11, wherein inputted data is a two-dimensional Huffman code of DCT coefficient which has been coded by two-dimensional Huffman method using run and level obtained by a predetermined scanning along the coefficients aligned in two orthogonal directions as a result of prediction-applied DCT conversion; and inverting a sine bit indicating positive and negative of the level of the selected code.

13. A descramble apparatus as defined in claim 11, wherein inputted data is obtained by selecting as a parameter to be scrambled, a "dct_dc_differential" signal of the image data and scrambling the selected parameter.

14. A descramble apparatus as defined in claim 11, wherein inputted data is obtained by selecting the code indicating how the image data has been quantized in coding the image data as a parameter to be scrambled and scrambling the selected parameter.

* * * * *